United States Patent [19]

Kamiyama et al.

[11] Patent Number: 5,736,077
[45] Date of Patent: Apr. 7, 1998

[54] METHOD FOR LINING A MANHOLE

[75] Inventors: Takao Kamiyama, Hiratsuka; Yasuhiro Yokoshima, Ibaraki-ken, both of Japan

[73] Assignees: Yokoshima & Company, Ibaraki-ken; Shonan Gosei-Jushi Seiksakusho K.K., Kanagawa-ken, both of Japan

[21] Appl. No.: 533,220

[22] Filed: Sep. 25, 1995

[30] Foreign Application Priority Data

Sep. 28, 1994 [JP] Japan .................... 6-232796
Dec. 13, 1994 [JP] Japan .................... 6-309276

[51] Int. Cl.⁶ ................... F04B 1/16; B32B 31/00
[52] U.S. Cl. .................... 264/32; 156/156; 156/294; 264/35; 264/36
[58] Field of Search .................... 264/32, 35, 36; 156/294, 287, 156

[56] References Cited

U.S. PATENT DOCUMENTS

| | | | |
|---|---|---|---|
| 4,685,983 | 8/1987 | Long, Jr. | 156/423 X |
| 4,980,116 | 12/1990 | Driver | 264/364 X |
| 5,106,440 | 4/1992 | Tangeman | 156/156 X |
| 5,108,533 | 4/1992 | Long, Jr. et al. | 156/287 X |
| 5,225,121 | 7/1993 | Yokoshima | 264/36 |
| 5,265,981 | 11/1993 | McNeil | 156/294 X |
| 5,348,764 | 9/1994 | Yokoshima | 264/36 X |
| 5,407,630 | 4/1995 | Smith | 264/36 X |
| 5,451,351 | 9/1995 | Blackmore | 264/36 X |
| 5,490,964 | 2/1996 | Kamiyama et al. | 264/36 |
| 5,501,248 | 3/1996 | Keist, Jr. | 264/36 X |
| 5,503,190 | 4/1996 | Kamiyama et al. | 264/36 X |

FOREIGN PATENT DOCUMENTS

| | | | |
|---|---|---|---|
| 60-242038 | 12/1985 | Japan . | |
| 1198325 | 8/1989 | Japan | 138/97 |
| 8908218 | 9/1989 | WIPO | 138/97 |

*Primary Examiner*—Karen Aftergut
*Attorney, Agent, or Firm*—Lowe, Price, LeBlanc & Becker

[57] ABSTRACT

A method for lining a manhole: (i) inserting into the manhole a tubular liner wet with a curable liquid resin; (ii) everting an inflatable plastic bag into the tubular liner by charging water in it; (iii) closing the open end of the everted bag to form a closed space inside the bag; (iv) supplying compressed air to the closed space to cause the plastic bag to inflate and press the liner against the manhole; and (v) curing the liquid resin to harden the liner; and further improvements include: plugging the main pipe with two plugs to isolate the manhole and stop the drain from wetting the manhole, but providing a hose penetrating through the plugs to allow the drain to flow past the manhole; partially filling the portion of the main pipe isolated between the two plugs with a liquid absorbent filler; the tubular liner has varied thickness increasing toward its lower end stepwise or continuously and has its lower opening covered up by a net attached to the lower end circumference of the liner.

2 Claims, 9 Drawing Sheets

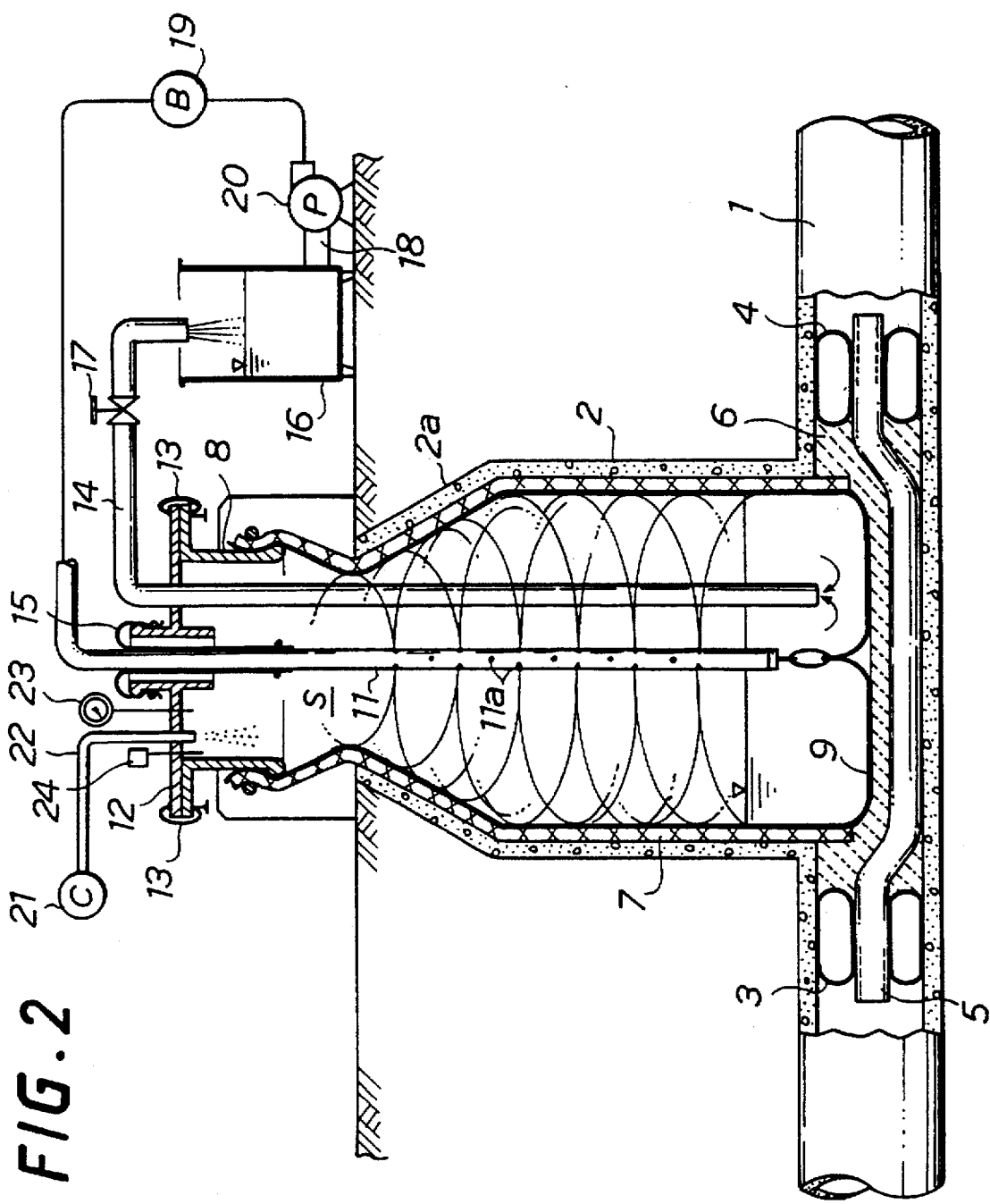

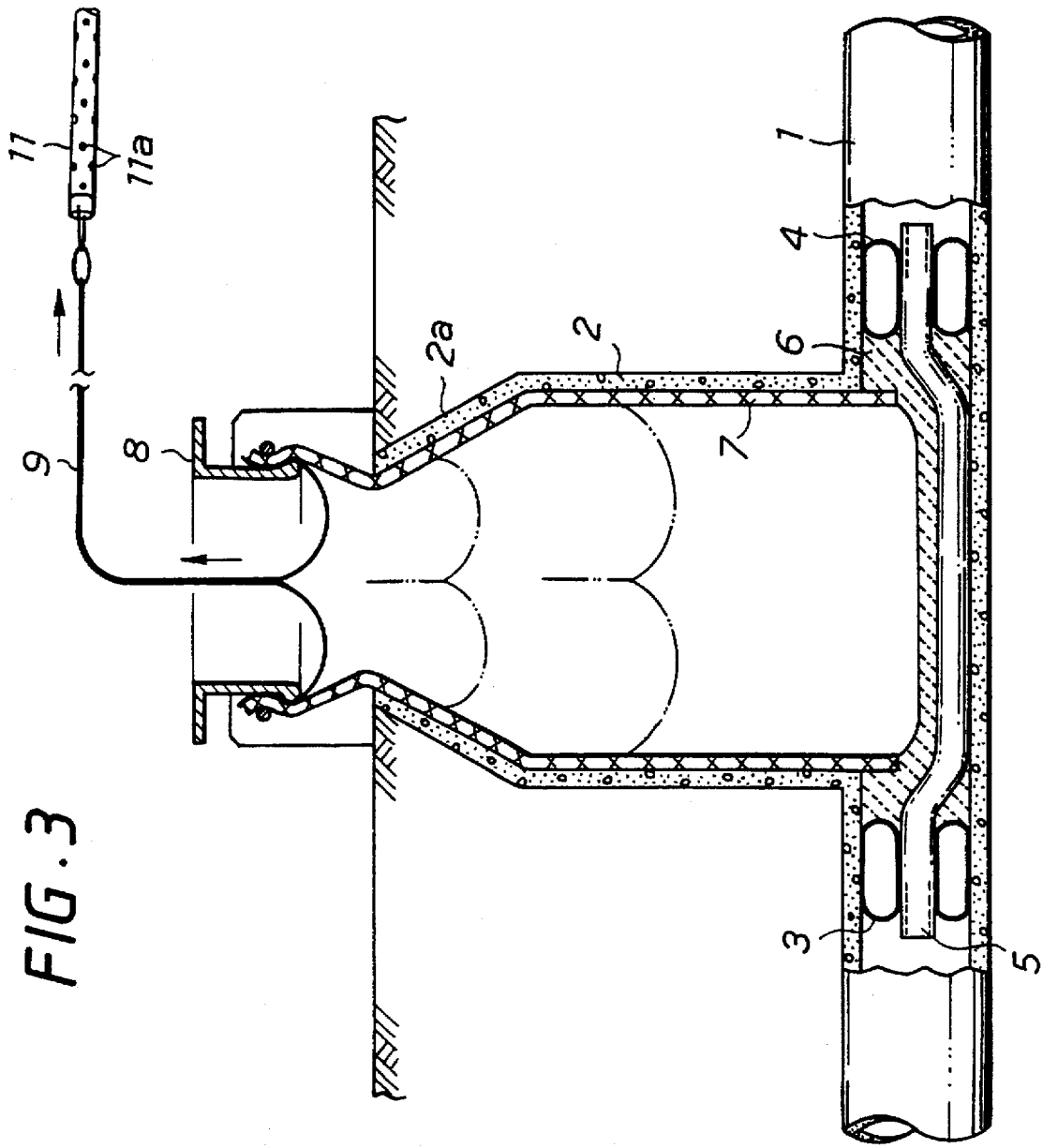

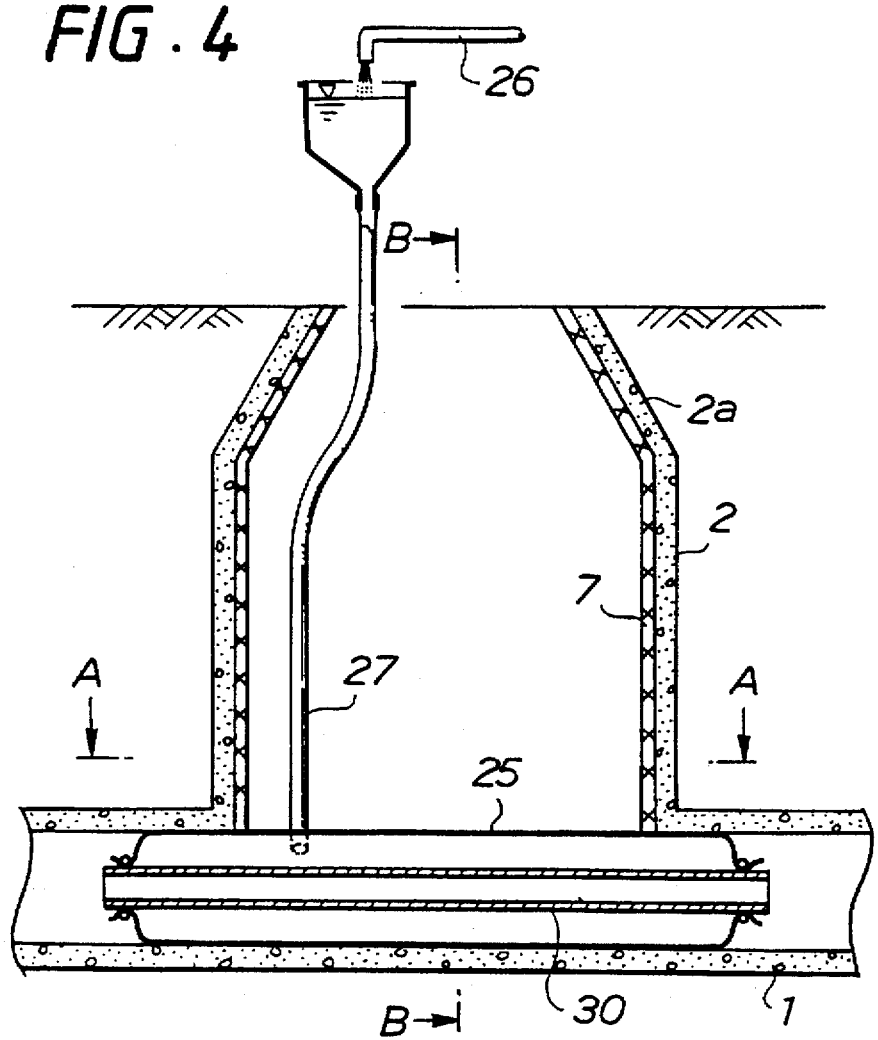
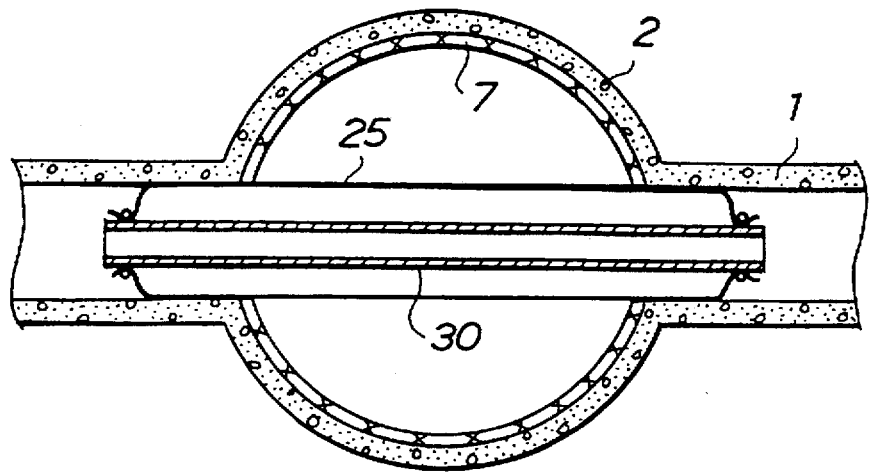

METHOD FOR LINING A MANHOLE

BACKGROUND OF THE INVENTION

1. Field of the Invention

The present invention relates to a method for lining a manhole by applying to the inner wall thereof a layer of a lining material impregnated with a hardenable liquid resin.

2. Description of the Prior Art

When an underground main pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of insertion shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid or by an inflatable pressure bag, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

It is possible to adopt this method as it is in lining a manhole.

Thus, in the case of a manhole 102, as shown in FIG. 11, first, a water stop plug 103 is introduced and inflated inside the main pipe 101 at a location upstream from the manhole 102 so as to stop the drain water from flowing into the location of lining; then, a tubular liner bag 107 is everted into the manhole 102 from the ground by means of water pressure, for example; while the liner bag 107 is pressed against the inner wall of the manhole 102, the hardenable liquid resin soaked through the thickness of the liner bag 107 is cured to harden the liner bag 107 and thus the manhole 102 is internally lined with the liner layer 107. Incidentally, the drain water that is stopped by the water stop plug 103 is drawn by a pump 140 at a location upstream from the plug 103, and transported to some other place, until the lining operation is completed and the plug 103 is removed.

Problems the Invention seeks to solve

However, as shown in FIG. 11, generally the upper part of a manhole 102 is formed with a reducer portion 102a where the hole is converged upward such that the manhole 102 is narrowest at its uppermost end, and this made it necessary to make a liner bag 107 to have a suitably irregular configuration. Although it is not so difficult to prepare the flexible resin-absorbent liner to tally with the reducer portion of the manhole (reducer fitting), it is very difficult to apply a plastic film to the outer surface of the thus prepared irregular resin-absorbent liner so as to make the liner material airtight without wrinkling the plastic film.

Furthermore, when the liner bag 107 is inserted by eversion into the manhole 102, there usually remains an uneverted portion of the bag 107 in the bottom 102b of the manhole 102, as shown in FIG. 11, and this portion after being hardened together with the everted portion of the liner must be cut off and removed, and this operation is quite troublesome and time-consuming.

Also, in this conventional manhole lining method, it is necessary to pump out the drain water from the pipe 101 that is stopped by the plug 103 and stagnates at a location upstream from the plug 103, and this operation with the pump 140 is troublesome too, for the drawn drain water, which is usually offensive to human senses, must be discharged somewhere else until the lining operation is completed.

Furthermore, when the resin soaked liner is pressed against the inner wall of the manhole, the uncured liquid resin oozes out from the liner and drops upon the main pipe floor and hardens at the time of curing. And this necessitates a hard work of removing it from the main pipe.

Still another problem lies in the fact that it is not easy to cure the liner uniformly and simultaneously, and if the everted liner bag is filled with hot water for curing, the heat energy consumed is extravagant, and this procedure requires the use of large heating and circulation devices such as boiler and hot water pump.

SUMMARY OF THE INVENTION

The present invention was made in view of the above problems and others and it is, therefore, an object of the invention to provide a new method for lining a manhole by virtue of which it becomes possible to simplify the manufacture of the liner bag and it is no longer necessary to remove the uneverted portion of the liner bag, so that the overall operation efficiency is greatly improved.

Also, it is another object of the invention to propose an improvement in the manhole lining method whereby the drain water is allowed to flow in the pipe while the manhole lining operation is conducted so that the operation becomes more rationalized.

Means to solve the Problems

In order to solve the above problems and others, there is proposed a method for lining a manhole which communicates with a main pipe at its bottom consisting of steps of: (a) inserting into the manhole a tubular liner which is soaked with a curable liquid resin; (b) everting an inflatable bag of a highly airtight plastic film into the tubular liner with a fluid pressure; (c) closing the open end of the everted bag thereby forming a closed space inside the bag; (d) supplying pressurized fluid to the closed space to thereby cause the bag to inflate and press the liner against the inner wall of the manhole; (e) curing the liquid resin to thereby harden the liner; and (f) removing the everted inflatable bag.

In a preferred example, the method further includes a step, prior to the above step (a), of plugging the main pipe with a first plug means and a second plug means such that the first plug means discommunicates the manhole from an upstream portion of the main pipe and the second plug means discommunicates the manhole from a downstream portion of the main pipe, and then communicating the upstream portion with the downstream portion by means of a hose.

Furthermore, in the above preferred example, the portion of the main pipe which is isolated between the first plug means and the second plug means is partially filled with a liquid absorbent filler which is light enough to be washed away by water flow.

In another preferred example, the curable liquid resin is a thermosetting resin and at the step (e) the curing of the resin is done by heating the resin with hot water ejected from a uniformly punctured hose drawn into the closed space.

It is also preferred that the method further includes a step, after the step (f), of plugging the holes of the main pipe opening into the manhole with a single inflatable body which is centrally penetrated by a hose and long enough to extend across the bottom of the manhole, and then laying a room-temperature curable resin mortar over the bottom floor of the manhole.

It is also preferable that the liner used in this method has varied thickness increasing toward its lower end stepwise or continuously.

It is also preferred that the liner has its lower opening covered up with a net attached to the lower end circumference of the liner.

Effects of the Invention

According to the invention, therefore, the tubular liner and the inflatable bag are used as separate entities so that it is not necessary to apply an airtight film layer to the liner permanently; hence, the reducer fitting of the liquid resin absorbent material constituting the liner is done relatively easily, and thus the manufacture of the liner is simplified. Nor is the creasing of the airtight bag on the liner a problem, for the airtight bag is removed from the liner eventually.

Furthermore, in this invention the liner 7 does not have to be a bag in shape, and hence the liner is bottomless after it is completely everted. Consequently, the conventional problem of the formation of the uneverted portion of the liner bag in the bottom of the manhole after the eversion of the liner bag is solved; thus, it is no longer necessary to cut and remove the hardened uneverted portion and the operation efficiency is much improved.

According to the method of the invention, the thickness of the liner increases stepwise or continuously toward the lower end of the everted liner, so that the manhole backed up with such a liner can withstand the underground pressures more effectively and safely.

Yet another advantage of the invention lies in the fact that even while the manhole is being lined, the drain water is allowed to flow in the main pipe past the manhole by virtue of the hose, so that it is no longer necessary to pump out the drain water from that part of the main pipe which is upstream to the manhole and discharge it at some other place. Hence, the operation is significantly rationalized and sanitarized.

Furthermore, according to the invention, the space underneath the liner is partially filled with a liquid resin absorbent filler which is light enough to be washed away by water flow, so that the liquid resin that drops from the lower end of the liner is absorbed by the filler and this filler is washed downstream in the main pipe by the drain water, and no trace of the resin remains in the main pipe. Consequently, the work of removing the hardened resin drops from the main pipe is now unnecessary.

Also, according to the present invention, the curable liquid resin wetting the liner is effectively heated by the hot water uniformly ejected from the punctuated hose so that the liquid resin is promptly cured uniformly with a reduced amount of heat energy. Therefore, it is possible to make more compact the heating and circulation devices.

The above and other objects and features of the invention will appear more fully hereinafter in the following description given in connection with the accompanying drawings and the novelty thereof pointed out in the appended claims.

BRIEF DESCRIPTION OF THE DRAWINGS

FIG. 2 is a sectional view of a site containing a manhole, illustrating another step of the manhole lining method according to the first example of the present invention;

FIG. 3 is a sectional view of a site containing a manhole, illustrating still another step of the manhole lining method according to the first example of the present invention;

FIG. 4 is a sectional view of a site containing a manhole, illustrating yet another step of the manhole lining method according to the first example of the present invention;

FIG. 5 is a cross section taken on line A—A of FIG. 4;

EXAMPLES

Next, examples of the present invention will be described with reference to the attached drawings.

Example 1

Figure 6:
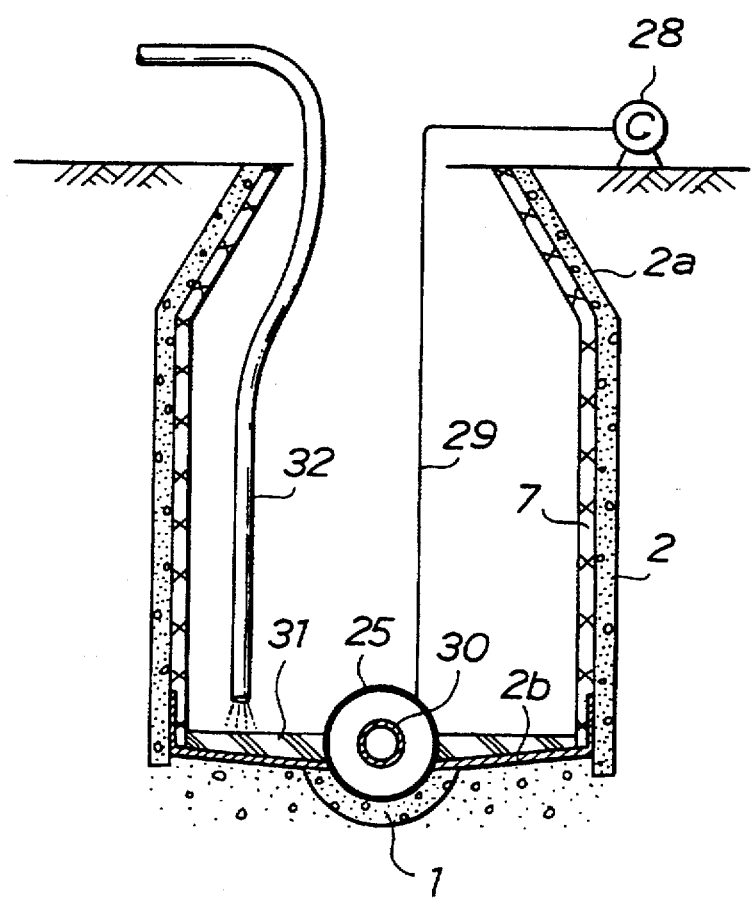
FIG. 6 is a cross section taken on line B—B of FIG. 4.

FIGS. 1 through 4 are sectional views to illustrate in sequence the manhole lining method according to the first example of the invention; FIG. 5 is a cross section taken on line A—A of FIG. 4; and FIG. 6 is a cross section taken on line B—B of FIG. 4.

Figure 1:
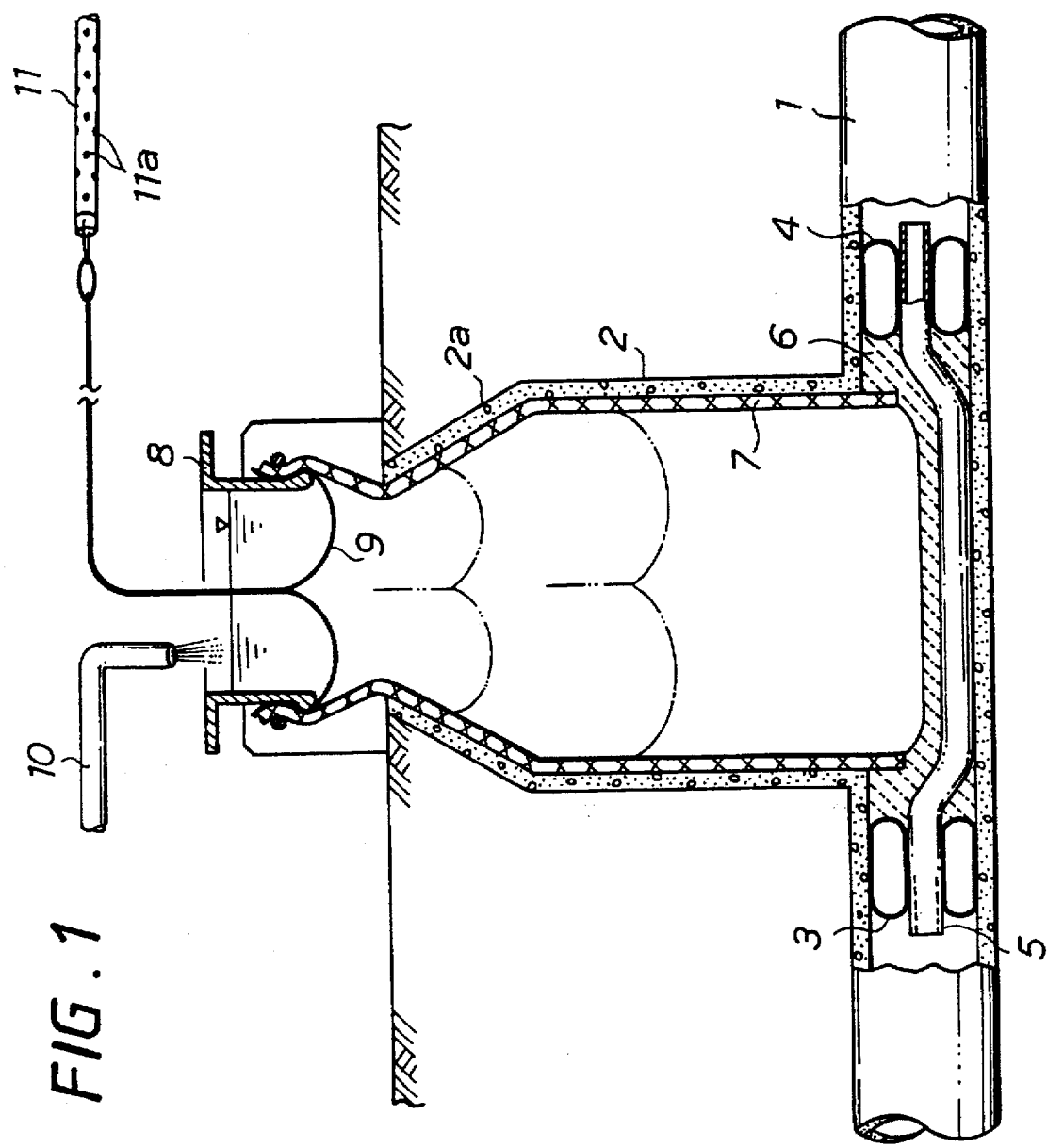
FIG. 1 is a sectional view of a site containing a manhole, illustrating a step of the manhole lining method according to a first example of the present invention.

In the lining method of the present invention, as shown in FIG. 1, two water stop plugs 3, 4 having a penetrating hole in them are installed in the pipe 1, one at a location upstream from the manhole 2 and the other downstream from the manhole 2, and a hose 5 is passed through the penetrating holes of the water stop plugs 3, 4 so that the drain water in the upstream side of the plug 3 can flow in the hose and run down into the downstream side of the plug 4. Furthermore, the space of the main pipe 1 isolated by the water stop plugs 3, 4 is partially filled with a liquid absorbent filler 6 such as sawdust and rice bran. Incidentally, before lining the manhole 2, a ladder, not shown, which is fastened to the inner wall of the manhole 2, is cut and removed.

Now, the upper part of a manhole 2 is formed with a reducer portion 2a where the hole is converged upward. A liner 7 has been inserted in the manhole 2 from above the ground in a manner such that the upper open end of the liner 7 extends outside the manhole 2 and is fastened around the lower periphery of an adaptor collar 8, which is installed on the ground, and the lower end of the liner 7 extends into the main pipe 1 slightly, as shown in FIG. 1.

Here, we will explain about the liner 7 itself. A lengthy rectangular resin-absorbent fabric sheet is sewed into a tubular shape, and then modified to tally with the reducer portion 2a of the manhole 2 (reducer fitting), and the liner fabric is soaked with a thermosetting liquid resin. This resin absorbent fabric may be a nonwoven felt of polyester, nylon, polypropylene, or acrylic resin, or a glass fiber cloth, glass fiber mat, or glass felt or a mixture of any of these. The thermosetting liquid resin to be permeated into the fabric may be unsaturated polyester resin, epoxy resin, vinyl ester resin, etc.

Now, a fluid pressure barrier liner bag 9, which is made of a highly airtight plastic film and generally tubular with its tail end closed, has its one end everted a little and fastened around the lower periphery of the adaptor collar 8, and when insertion of the liner 7 into the manhole 2 is completed, water is charged from a water hose 10 into the pocket formed by the slight eversion of the fluid pressure barrier liner bag 9. Then, the fluid pressure barrier liner bag 9 is caused by the water pressure (the water weight) to evert and be inserted downwardly along the liner 7. Incidentally, the diameter of the fluid pressure barrier liner bag 9 is greater than minimum inner diameter of the liner 7, which is at the upper end of the reducer portion 2a of the manhole 2.

When insertion of the fluid pressure barrier liner bag 9 along the liner 7 by eversion is completed, a hot water hose 11 attached beforehand to the tail end of the fluid pressure barrier liner bag 9 is drawn into the liner bag 9, as shown in FIG. 2. The hot water hose 11 is made with a lot of punctures 11a distributed evenly along that portion of the hose 11 which is disposed inside a closed space S (hereinafter described).

Next, as shown in FIG. 2, a cap 12 is placed over the top opening portion of the adaptor collar 8, and is fastened there to airtightly close the opening of the collar 8 with a plural number of G clamps 13, whereupon a closed space S is formed inside the fluid pressure barrier liner bag 9.

Now, the hot water hose 11 and a water outlet hose 14 are drawn deep into the space S to open therein, and a tubular hole of the cap 12 through which the hot water hose 11 penetrates the cap 12 is lined with a seal tube 15, with which the hole is airtightly sealed with respect to the hose 11. Also, that part of the water outlet hose 14 which extends outside the closed space S is led to a hot water tank 16 installed on the ground, and the water outlet hose 14 opens over this tank; a valve 17 is provided across the water outlet hose 14 at a location near this open end of the hose 14.

A water supply pipe 18 leading out from the lower part of the hot water tank is connected to an inlet port of a boiler 19, and a hot water pump 20 is provided across the water supply pipe 18. To an outlet port of the boiler 19 is connected one end of the hot water hose 11.

An air hose 22 leading out from a compressor 21 is fitted through the cap 12 to open in the closed space S, and a pressure gauge 23 for measuring the inner pressure of the closed space S and a safety valve 24 for keeping the inner pressure of the closed space S at a level lower than a predetermined value are provided to communicate with the closed space S across the cap 12.

Thus, as the compressor 21 is driven to supply compressed air to the closed space S via the air hose 22, the fluid pressure barrier liner bag 9 is inflated with the compressed air and presses the liner 7 upon the inner wall of the manhole 2. Incidentally, on this occasion, as the liner 7 is pressed by the compressed air, the uncured liquid thermosetting resin soaked through the thickness of the liner 7 is caused to ooze out from the lower end of the liner 7 and drops into the filler 6 such as sawdust and rice bran.

Next, while keeping the things as described above, the hot water pump 20 and the boiler 19 are switched on, whereupon the water in the hot water tank 16 is drawn and sent to the boiler 19 by the hot water pump 20, and after the water is heated to a predetermined temperature by the boiler 19, it is supplied to the closed space S by way of the hot water hose 11. Then, the hot water rushing into the hot water hose 11 jets out from the punctures 11a of the hot water hose 11 and reaches the surfaces of the liner 7 to heat the same.

When the hot water has been used to heat the liner 7 it becomes lukewarm and falls and gathers in the bottom of the fluid pressure barrier liner bag 9, and this lukewarm water is pushed down by the internal pressure of the closed space S and, as the result, the water goes up in the water outlet hose 14, and returns to the hot water tank 16; then, the water is again sent to the boiler 19 by the hot water pump 20 and heated and, thereafter, circulated in this system over and over again.

As described above, as the hot water is circulated, the hot water jets out from the evenly distributed punctures 11a of the hot water hose 11 and heats the liner 7 to cause the thermosetting resin soaked through the liner 7 to be cured evenly and promptly. When the thermosetting resin in the liner 7 is thus hardened, the fluid pressure barrier liner bag 9 is pulled up and removed from the liner 7, as shown in FIG. 3. Now, the inner wall of the manhole 2 is lined with the rigid liner 7.

Thus, in the above-described example of manhole lining operation starting with the step of inserting the liner 7 into the manhole 2 and ending with the step of eventually removing the fluid pressure barrier liner bag 9, the drain water is allowed to flow in the main pipe 1 past the manhole 2 by virtue of the hose 5, so that it is no longer necessary to pump out the drain water from that part of the main pipe 1 which is upstream to the manhole 2 and discharge it at some other place. Hence, the operation is significantly rationalized.

When the above-described lining operation is completed, the water stop plugs 3, 4 and the hose 5 are removed from the main pipe 1, and then the filler 6 remaining in the main pipe 1 is carried downstream in the pipe 1 by the drain water, so that the thermosetting resin that has dropped into the filler 6 during the lining operation is also brought away in the filler 6. Consequently, the thermosetting resin that has dropped in the pipe 1 does not remain in the main piper and the work of removing the hardened resin is now unnecessary.

Thereafter, as shown in FIG. 4, the unnecessary portions of the liner 7 are cut and removed, and the holes of the main pipe 1 opening into the manhole 2 are plugged with a single fluid pressure bag 25, which extends across the bottom of the manhole 2 and is placed to cover up the main pipe groove that runs in the bottom of the manhole 1 (FIG. 6). In particular, the fluid pressure bag 25, which is inflatable and deflatable and comprises a hose 30 running centrally through it, is set in the manhole opening holes of the main pipe 1, and as the water is supplied to the fluid pressure bag 25 via a water pour hose 26 and a water supply hose 27, the fluid pressure bag 25 is inflated with water, and plugs both of the manhole opening holes of the pipe 1, as described above. Alternatively, as shown in FIG. 6, compressed air is supplied to the fluid pressure bag 25 from a compressor 28 via an air hose 29 to thereby inflate the fluid pressure bag 25 with the compressed air and plug the manhole opening holes of the pipe 1.

Incidentally, by virtue of the hose 30 penetrating through the fluid pressure bag 25, the portion of the main pipe 1 which is upstream to the manhole 2 and the portion of the main pipe 1 which is downstream to the manhole 2 are in communication with each other to allow the drain water to keep flowing even while the manhole opening holes of the main pipe 1 are plugged with the fluid pressure bag 25.

Next, as shown in FIG. 6, a room-temperature curable resin mortar (a mixture of a thermosetting resin and sand) 31 is laid over a convergent part 2b of the bottom floor of the manhole 2, which is that portion of the manhole floor that is not occupied by the main pipe groove 1 (i.e., the part not covered up by the fluid pressure bag 25) by means of a charge hose 32. Then, the resin mortar 31 is cured over the convergent part 2b and forms a rigid floor liner integral with the liner 7 whereby water is prevented from leaking into or out from the manhole 2 at the boundaries of the convergent part 2b of the manhole floor. Incidentally, on this occasion too, the drain water is allowed to keep flowing downstream in the pipe 1 via the hose 30 so that it is not necessary to pump out the drain water from that part of the pipe 1 which is upstream to the manhole 2 and discharge it at some other place. Hence, the operation efficiency is significantly improved.

Thereafter, the fluid pressure bag 25 and the hose 30 are removed from the main pipe 1, and a ladder, not shown, is fastened to the newly lined inner wall of the manhole 2, and thus a series of manhole lining operation is completed.

In the present example, the liner 7 and the fluid pressure barrier liner bag 9 are designed in a manner such that they are used as separate entities and are separable from each other so that it is not necessary to apply the liner bag 9 to the liner 7 permanently; hence, the reducer fitting of the liquid resin absorbent material constituting the liner 7 is done relatively easily, and thus the manufacture of the liner 7 is simplified. Owing to the fact that the fluid pressure barrier liner bag 9, which is everted into the liner 7 after the latter is received in the manhole 2, has a diameter greater than the minimum diameter of the liner 7 at the upper end of the reducer portion, the fluid pressure barrier liner bag 9 is easily creased at the time of its eversion; however, this is not at all a problem, for the fluid pressure barrier liner bag 9 is removed from the liner 7 eventually.

Furthermore, in the present example, the fluid pressure barrier liner bag 9 is not everted into the manhole 2 simultaneously and in one body with the liner 7 as the backing for the latter and it is only after the liner 7 is inserted into the manhole 2 that the fluid pressure barrier liner bag 9 is inverted inside the liner 7, so that the liner 7 does not have to be a bag in shape, and hence the liner 7 is bottomless after it is completely everted (ref. FIG. 1). Consequently, the conventional problem of the unavoidable formation of the uneverted portion of the liner bag in the bottom of the manhole 102 after the eversion of the liner bag is solved. Thus, it is no longer necessary to cut and remove the hardened uneverted portion and consequently the operation efficiency is much improved.

Also, according to the present example, the thermosetting resin soaked through the thickness of the liner 7 is effectively heated by the hot water uniformly ejected from the hot water hose 11 so that the thermosetting resin is promptly cured uniformly with a minimum amount of heat energy. Therefore, it is possible to make more compact the heating and circulation devices such as boiler 19 and hot water pump 20.

Incidentally, in the above example, hot water showering is used as the method for thermally curing the thermosetting resin, it is equally effective to employ other heating methods such as filling the fluid pressure barrier liner bag 9 with hot water, circulating hot water, and using steam. Also, it is possible that the thermosetting resin may be replaced by another hardenable resin such as photosetting resin.

Figure 7:
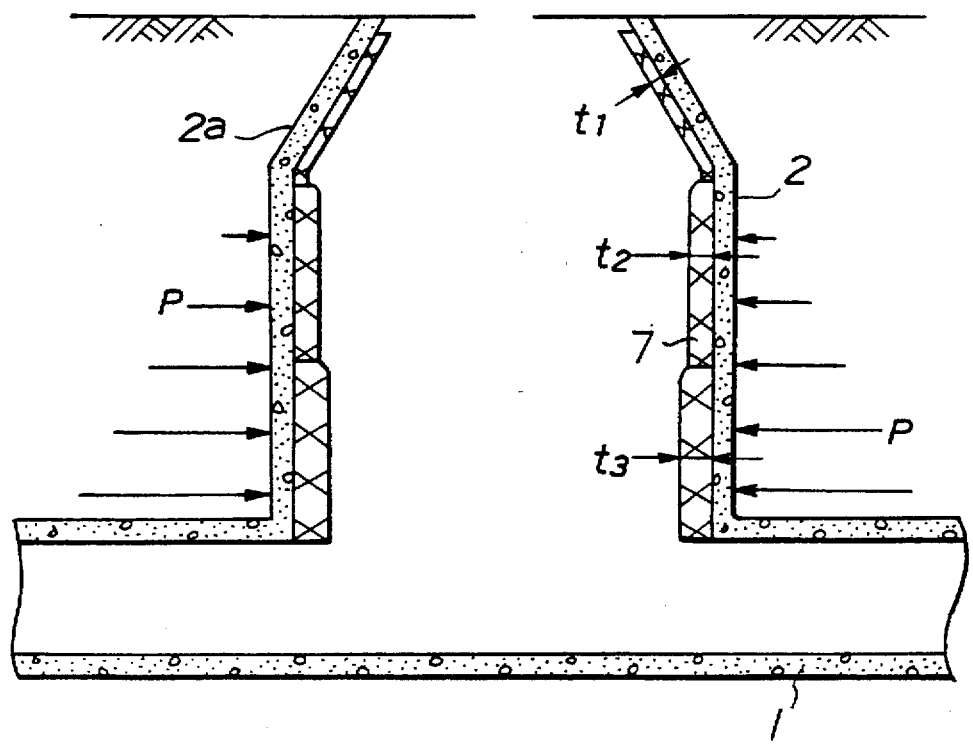
FIG. 7 is a sectional view of a manhole, illustrating another type of a liner that can be used in the method of the present invention.

Now, as shown in FIG. 7, the pressure P that works upon the walls of the manhole 2 due to the underground water etc. increases with depth so that it is a rational and a safer design to make the liner in a manner such that its thickness increases stepwise as the depth increases. For example in FIG. 7 the thicknesses $t_1$, $t_2$, and $t_3$ are made different such that $t_1 < t_2 < t_3$.

Example 2

Figure 8:
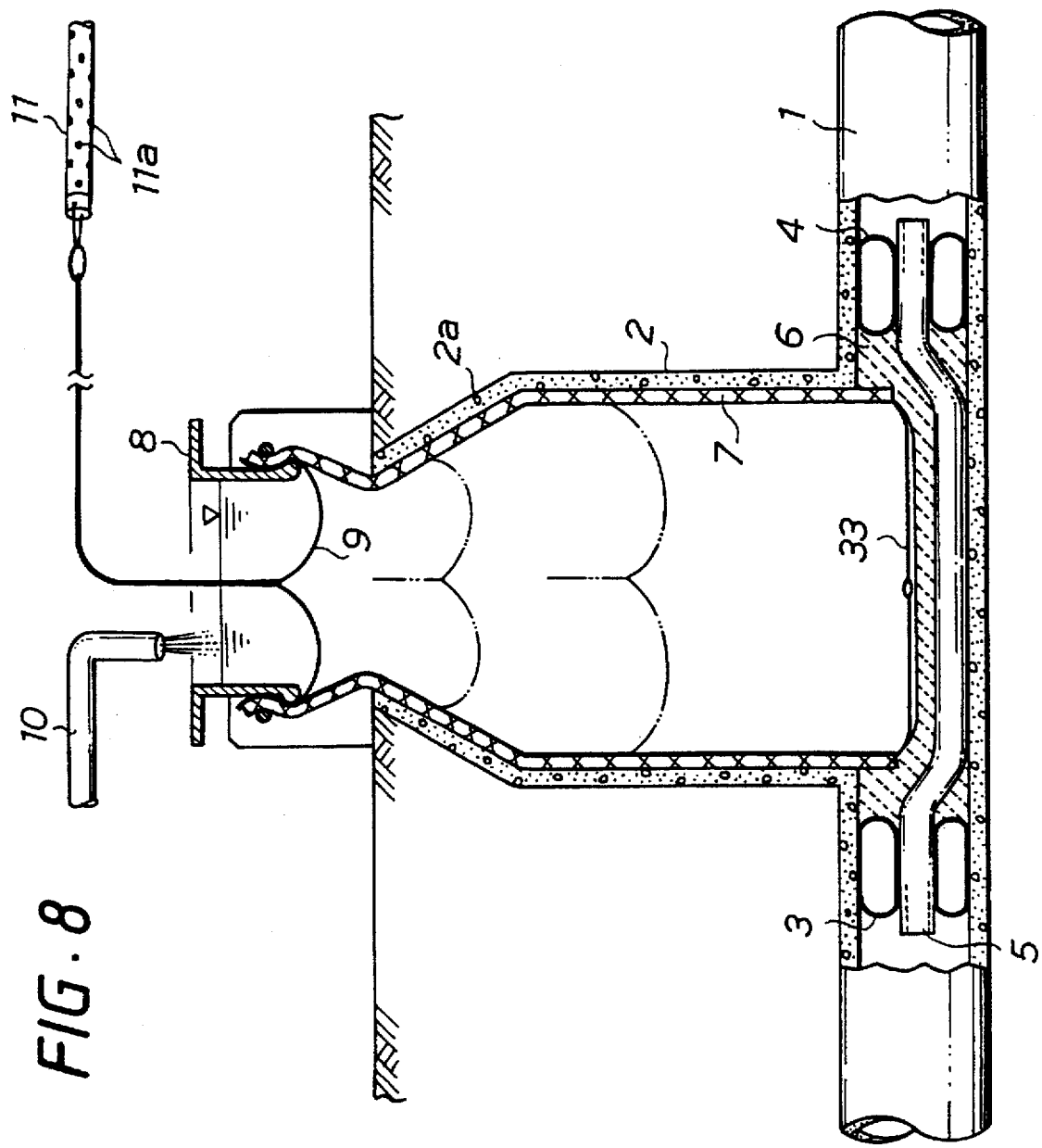
FIG. 8 is a sectional view of a site containing a manhole, illustrating a step of the manhole lining method according to a second example of the present invention.
Figure 9:
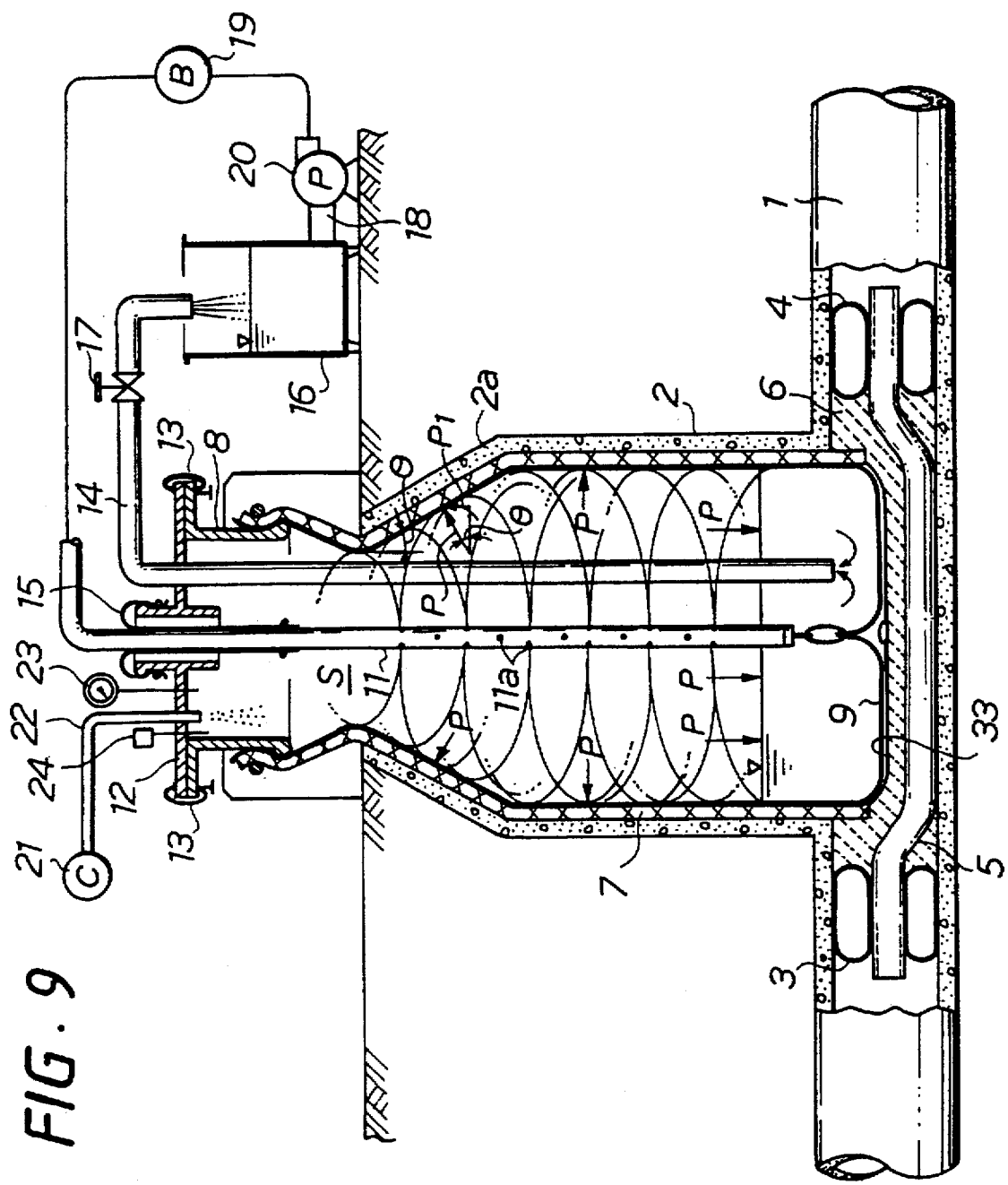
FIG. 9 is a sectional view of a site containing a manhole, illustrating another step of the manhole lining method according to the second example of the present invention.
Figure 10:
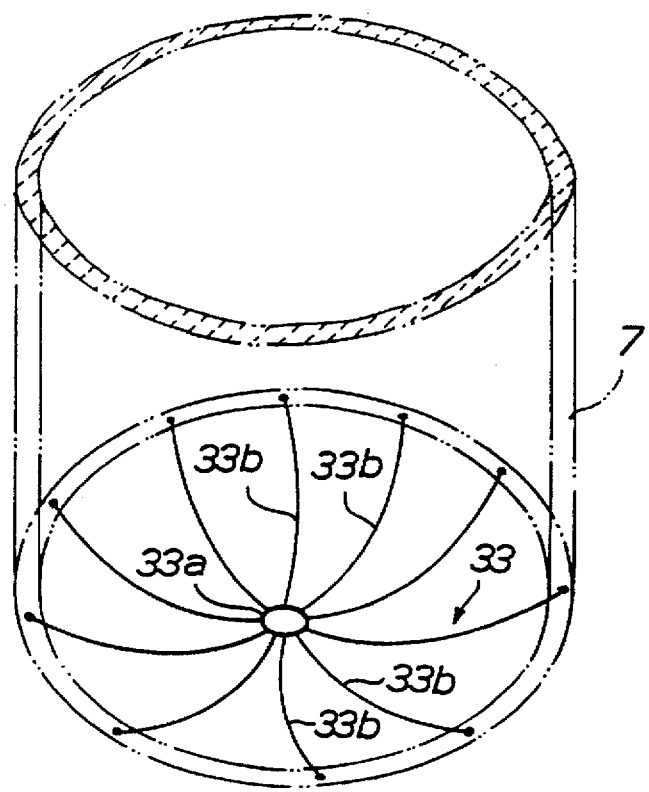
FIG. 10 is a perspective view of a net.
Figure 11:
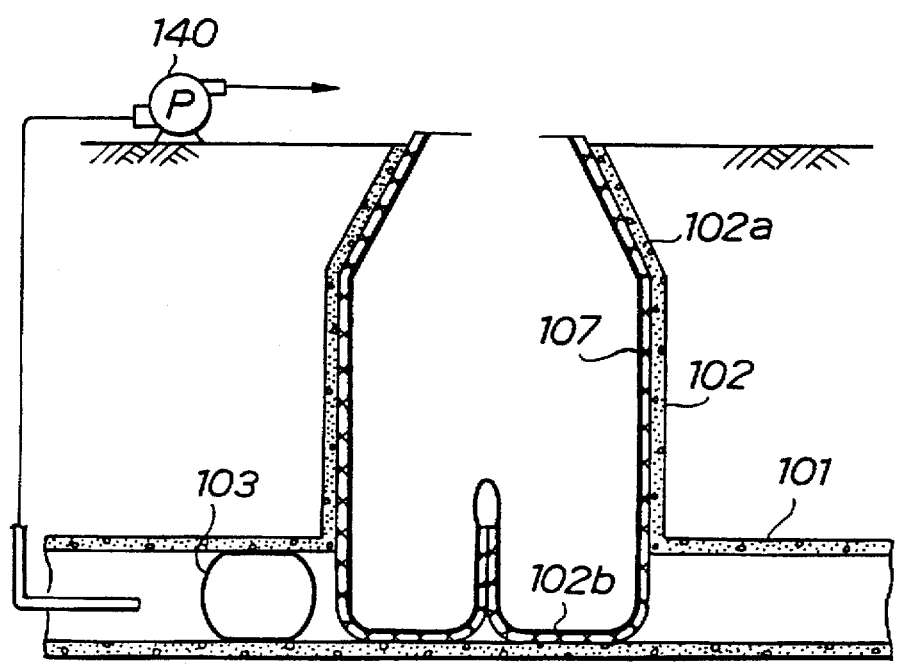
FIG. 11 is a cross-section view of a manhole.

Next, a second example of the present invention will be described with reference to FIGS. 8 through 10. Incidentally, FIG. 8 and FIG. 9 are sectional views of a site containing a manhole, illustrating two steps from the manhole lining method according to the second example of the present invention, and FIG. 10 is a perspective view of a net. In FIGS. 8 and 9 the elements that have counterparts in FIGS. 1 and 2 are designated with the same numerals as are given to their counterparts in FIGS. 1 and 2, and the description of such elements are omitted here.

In this second example, as shown in FIG. 8, a net 33 is attached to the lower periphery of the liner 7 inserted into the manhole 2 in a manner as shown in FIG. 10, and all the other construction of this example is exactly the same as that of the first example.

The net 33 is to receive the fluid pressure barrier liner bag 9, and is arranged such that a plurality of ropes 33b of the same length are permanently connected to a central round button 33a and the free ends of the ropes 33 are detachably connected to the lower end of the tubular liner 7 at equal intervals. Thus, the net 33 covers across the lower end opening of the liner 7.

Now, when the liner 7 is inserted into the manhole 2 from above the ground, as shown in FIG. 8, the net 33 attached to the lower end of the liner 7 comes to lie in the bottom of the manhole 2.

Then, in a similar manner as in the first example, water is charged from a water hose 10 into the pocket formed in the slightly everted fluid pressure barrier liner bag 9, whereupon the fluid pressure barrier liner bag 9 is caused by the water weight to evert and be inserted downwardly along the liner 7.

When insertion of the fluid pressure barrier liner bag 9 inside the liner 7 by eversion is completed, the compressor 21 is driven to supply compressed air to the closed space S via the air hose 22, and the fluid pressure barrier liner bag 9 is inflated with the compressed air and presses the liner 7 upon the inner wall of the manhole 2, as shown in FIG. 9. On this occasion, the vertical component $P_1$ of the pressure P of the compressed air working normally upon the reducer portion 2a of the manhole 2 tends to cause the liner 7 to slip upward. Incidentally, the vertical component $P_1$ is expressed by the following equation:

$P_f = P \cdot \sin\theta$, wherein θ is the angle by which the reducer portion 2a is tilted from the perpendicular.

However, in this example, the net 33 is attached at the lower end periphery of the liner 7, as described above, so that the pressure P of the compressed air prevailing in the closed space S works downward upon the net 33, which in turn pulls the liner 7 downward and prevents it from slipping upward.

The operation that pursues is similar to that in the first example except that when the fluid pressure barrier liner bag 9 is removed from inside the liner 7 after the curing of the liner 7 is completed, the net 33 is detached from the liner 7 and retrieved.

As described above, in this second example, the upward slipping of the liner 7 is prevented and besides this all the effects of the first example are attained as well.

While the invention has been described in its preferred examples, it is to be understood that modifications will occur to those skilled in the art without departing from the spirit of the invention. For instance, the thermosetting resin may be replaced by another hardenable resin such as photosetting resin. The scope of the invention is therefore to be determined solely by the appended claims.

What is claimed is:

1. A method for lining a manhole which communicates with a main pipe at a bottom of said manhole, which method comprises the steps of:

(a) plugging said main pipe with a first plug means and a second plug means such that said first plug means disconnects said manhole from an upstream portion of said main pipe and said second plug means disconnects said manhole from a downstream portion of said main pipe, and then communicating said upstream portion with said downstream portion by means of a hose extending between said first plug means and said second plug means;

(b) partially filling that portion of said main pipe which is isolated between said first plug means and said second plug means, with a liquid absorbent filler which absorbs liquid resin pressed out of a tubular liner inserted into said manhole and thereby prevents said liquid resin pressed out of said liner from coming in contact with said main pipe;

(c) inserting into said manhole said tubular liner which is soaked with said curable liquid resin;

(d) everting an inflatable bag of a highly airtight plastic film into said tubular liner with a fluid pressure;

(e) closing an open end of said everted bag thereby forming a closed space inside said bag;

(f) supplying pressurized fluid to said closed space to thereby cause said bag to inflate and press said liner against an inner wall of said manhole such that liquid resin pressed out of said liner is absorbed by said liquid absorbent filler;

(g) curing said liquid resin of said liner to thereby harden said liner;

(h) removing said everted inflatable bag from said manhole; and (i) removing said liquid absorbent filler from said main pipe.

2. The method according to claim 1, wherein said liquid absorbent filler is capable of being washed away by a drain fluid, and said step (i) comprises washing said liquid absorbent filler away with said drain fluid.

* * * * *